(12) United States Patent
Freund et al.

(10) Patent No.: US 7,964,662 B2
(45) Date of Patent: Jun. 21, 2011

(54) ADHESIVE FORMULATION FOR VACUUM FORMING APPLICATIONS

(75) Inventors: David F. Freund, Milwaukee, WI (US); Rodney M. Weston, St. Francis, WI (US)

(73) Assignee: Bostik, Inc., Wauwatosa, WI (US)

( * ) Notice: Subject to any disclaimer, the term of this patent is extended or adjusted under 35 U.S.C. 154(b) by 527 days.

(21) Appl. No.: 11/413,031

(22) Filed: Apr. 27, 2006

(65) Prior Publication Data

US 2007/0251640 A1 Nov. 1, 2007

(51) Int. Cl.
*C08G 18/08* (2006.01)
*C08L 75/00* (2006.01)
*B29C 65/00* (2006.01)
*C08F 8/30* (2006.01)
*B32B 27/00* (2006.01)
*B32B 27/40* (2006.01)

(52) U.S. Cl. ...... 524/507; 156/285; 525/123; 428/423.1

(58) Field of Classification Search .................. 524/507; 15/285; 525/123; 428/423.1; 156/285
See application file for complete search history.

(56) References Cited

U.S. PATENT DOCUMENTS

| 4,463,110 | A | * | 7/1984 | Perlinski et al. | 523/409 |
|---|---|---|---|---|---|
| 5,385,979 | A | * | 1/1995 | Ozawa et al. | 525/145 |
| 5,430,094 | A | * | 7/1995 | Gola et al. | 524/507 |
| 5,652,298 | A | * | 7/1997 | Murray | 524/571 |
| 6,297,312 | B1 | | 10/2001 | Wang | |
| 6,310,125 | B1 | * | 10/2001 | Rayner | 524/195 |
| 2004/0014880 | A1 | * | 1/2004 | Kuba et al. | 524/589 |
| 2004/0038041 | A1 | | 2/2004 | Chao et al. | |

FOREIGN PATENT DOCUMENTS

| EP | 0451978 | 10/1991 |
|---|---|---|
| EP | 1059346 | 12/2000 |
| WO | WO 01/77248 | 10/2001 |

* cited by examiner

*Primary Examiner* — Mark Eashoo
*Assistant Examiner* — Angela C Scott
(74) *Attorney, Agent, or Firm* — Andrus, Sceales, Starke & Sawall, LLP

(57) ABSTRACT

An aqueous adhesive composition comprising a polychloroprene emulsion; an adhesion promoting agent that promotes adhesion to polyolefin substrates; a polyurethane polymer dispersion; an aqueous tackifying resin dispersion; and a rubber latex dispersion. A multi-layer composite and methods for adhering a thermoplastic material to a rigid substrate using the aqueous adhesive composition also are described.

34 Claims, No Drawings

ADHESIVE FORMULATION FOR VACUUM FORMING APPLICATIONS

FIELD OF THE INVENTION

The present invention relates to an aqueous vacuum-forming laminating adhesive composition. The adhesive composition is particularly useful for lamination of thermoplastic materials to rigid substrates having low surface energy such as polyolefin-based substrates which typically are used in the automotive industry.

BACKGROUND OF THE INVENTION

Vacuum forming is a well known process, particularly in the automotive industry. For example, a thermoplastic material (e.g., polyvinyl and polyurethane flexible sheeting) can be laminated onto automobile components such as consoles, instrument panels, arm rests, door panels and other interior surfaces using vacuum forming. The thermoplastic material has an outer side, which typically provides color and texture to the resulting laminated substrate, and an underside which can further include a primer layer for enhanced adhesion to the substrate. Common substrates typically include a variety of known materials, such as acrylonitrile-butadiene-styrene terpolymer (ABS) or fiberboard. The process typically includes coating the substrate with a laminating adhesive, heating the thermoplastic material past its softening point, and draping the thermoplastic material onto the substrate. A vacuum is then applied through the substrate to pull the thermoplastic material onto the contours of the substrate, thereby forming a conformal layer of the thermoplastic material over at least a portion of the substrate.

Use of organic solvent-based adhesives in vacuum forming is common in the industry. However, emission of organic solvents to the atmosphere can be a concern, and reduction of the volatile organic content of adhesive compositions is very desirable to comply with government regulations. Such adhesives also can present other environmental hazards typically associated with organic solvents. Many of the known adhesive compositions are provided in the form of a two-pack system. Exemplary of such two-pack solvent-based compositions are those known in the art in which one pack is based on an aromatic polyurethane, and another pack is based on a crosslinking agent such as an unblocked isocyanate. The two packs must be stored separately and mixed only just prior to application. Once admixed, such compositions are stable for only several hours, and within several hours recognizable performance decreases are observed.

In contrast, single package water-based vacuum-forming laminating adhesive compositions can provide obvious advantages over the two-package solvent-based compositions. Such aqueous adhesive compositions are known. For example, known are stable aqueous adhesive compositions that include a vinyl acetate polymer, an ionic water-dispersed polyurethane, and an aziridine. Also known in the art are water-based vacuum-forming laminating adhesive compositions that include an ionic water-dispersed polyurethane formed by chain extending an isocyanate functional prepolymer with a polyamine and a ketimine, a carbodiimide and/or an aziridine and, optionally a vinyl acetate polymer. Such water-based adhesive compositions provide excellent adhesion of thermoplastic materials to conventional rigid substrates such as ABS and fiberboard.

More recently, there has been an attempt to replace the aforementioned ABS and fiberboard rigid substrates with substrates comprising materials which are more readily recyclable such as rigid thermoplastic polyolefinic materials which are lower in surface energy than ABS, for example polypropylene. However, conventional water-based laminating vacuum forming adhesive compositions such as those described above often do not provide sufficient adhesion of the thermoplastic material to such polyolefin substrates. As a result, polychloroprene-based aqueous adhesive compositions have been developed, such as those described in U.S. Pat. No. 6,939,432. However, polychloroprene is relatively expensive and in limited supply.

Thus, it would be desirable to provide an aqueous-based, vacuum-formable laminating adhesive composition which provides excellent adhesion of thermoplastic materials to rigid polyolefin substrates, while maintaining heat and humidity resistance properties, and which minimizes the need for ingredients such as polychloroprene.

SUMMARY OF THE INVENTION

The present invention is directed toward an aqueous-based, vacuum forming laminating adhesive composition. The adhesive composition uses minimal amounts of polychloroprene by incorporating tackifying resin and rubber latex to provide the adhesion characteristics necessary for bonding to rigid polyolefin substrates. Although the use of tackifying resin and rubber latex would normally tend to lower the heat resistance property of the adhesive composition, the present composition avoids this disadvantage by utilizing only select resins together with polyurethane dispersions having a crossover temperature of at least 65° C., and preferably at least 140° C.

In one embodiment, the present invention is directed to an aqueous adhesive composition comprising: (a) 0 to 25 percent by weight of a polychloroprene emulsion; (b) 0.5 to 25 percent by weight of an adhesion promoting agent that promotes adhesion to polyolefin substrates; (c) 0.5 to 40 percent by weight of a polyurethane polymer dispersion; (d) 0.5 to 40 percent by weight of an aqueous tackifying resin dispersion; and (e) 5 to 98.5 percent by weight of a rubber latex dispersion.

In a further embodiment, the present invention is directed to a multi-layer composite comprising (1) a rigid, polyolefin substrate; (2) an adhesive layer over at least a portion of the substrate; and (3) a thermoplastic cover layer over at least a portion of the adhesive layer, wherein the adhesive layer is formed from an aqueous adhesive composition comprising: (a) 0 to 25 percent by weight of a polychloroprene emulsion; (b) 0.5 to 25 percent by weight of an adhesion promoting agent that promotes adhesion to polyolefin substrates; (c) 0.5 to 40 percent by weight of a polyurethane polymer dispersion; (d) 0.5 to 40 percent by weight of an aqueous tackifying resin dispersion; and (e) 5 to 98.5 percent by weight of a rubber latex dispersion; wherein the polyurethane polymer (c) is present in an amount sufficient to provide adhesion of the cover layer to the substrate such that the multi-layer composite passes adhesion testing as determined in accordance with Toyota Creep Test Specification F7754G.

The present invention is further directed to a method for adhering a thermoplastic material to a rigid polyolefin substrate. The method comprises the steps of (1) applying the aqueous adhesive composition described above to at least a portion of the substrate; (2) drying the composition to form a dried adhesive layer on the substrate; (3) heating the thermoplastic material separate from the substrate; (4) contacting the thermoplastic material to the dried adhesive layer; and (5) applying a vacuum to the substrate of step (4) for a time and at a temperature sufficient to adhere the thermoplastic material to the substrate.

In addition, the present invention provides a method for adhering a thermoplastic material to a rigid polyolefin substrate comprising the steps of (1) providing a thermoplastic material having a top surface and a bottom surface; (2) applying the previously described aqueous adhesive composition to the bottom surface of the thermoplastic material; (3) drying the composition to form an adhesive layer on the bottom surface of the thermoplastic material; (4) heating the thermoplastic material of step (3) separate from the substrate; (5) contacting the adhesive layer on the bottom surface of the thermoplastic material to the rigid polyolefin substrate; and (6) applying a vacuum to the substrate of step (5) for a time and at a temperature sufficient to adhere the thermoplastic material to the substrate.

DETAILED DESCRIPTION OF THE INVENTION

Other than in the operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties sought by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of 1" to 10" is intended to include all sub-ranges between and including the recited minimum value of 1 and the recited maximum value of 10, that is, having a minimum value equal to or greater than 1 and a maximum value of equal to or less than 10.

In a particular embodiment, the present invention is directed to an aqueous adhesive composition including a blend of at least the following ingredients:

(a) 0 to 25 percent by weight of a polychloroprene emulsion;

(b) 0.5 to 25 percent by weight of an adhesion promoting agent that promotes adhesion to polyolefin substrates;

(c) 0.5 to 40 percent by weight of a polyurethane polymer dispersion;

(d) 0.5 to 40 percent by weight of an aqueous tackifying resin dispersion; and (e) 5 to 98.5 percent by weight of a rubber latex dispersion.

The above ingredients, together with any optional additives desired to enhance a particular property of the composition, total 100% by weight of the adhesive composition.

Although any of the known chlorinated rubbers are suitable for use as component (a), a polychloroprene such as, for example neoprene, is most often employed in the aqueous adhesive composition of the present invention. A particularly suitable polychloroprene is Neoprene AQR0033, a 46 percent by weight latex, commercially available from Dupont. Another suitable polychloroprene is Neoprene L750, a 50 percent by weight latex, commercially available from Dupont.

The polychloropene (a) can be present in the aqueous adhesive composition of the present invention in an amount of about 0 to about 25 percent by weight, more preferably in an amount of about 5 to about 25 percent by weight, and most preferably in an amount of about 10 percent to about 25 percent by weight. The amount of polychloroprene (a) present in the aqueous adhesive composition of the present invention can range between any combination of these values, inclusive of the recited values.

In addition to polychloroprene, the aqueous adhesive composition of the present invention further comprises (b) an adhesion promoting agent that promotes adhesion to polyolefin substrates. Preferred adhesion promoting agents are those selected from at least one of a halogenated polyolefin other than polychloroprene, an acrylic modified polyolefin, a hydroxylated polybutadiene, and mixtures thereof. The halogenated polyolefin can include any of the halogenated polyolefin materials commonly known in the art. Typically, the halogenated polyolefin comprises a chlorinated polyolefin, such as a chlorinated polyolefin selected from at least one of chlorinated polypropylene, chlorinated polyethylene, chlorinated ethylene-vinyl acetate copolymer, for example, ethylene-vinyl acetate-vinyl chloride copolymer, mixtures thereof and copolymers thereof. The chlorinated polyolefin can have a chlorine content of ranging from 10 to 40 weight percent, often from 10 to 30 weight percent, and typically from 15 to 25 weight percent based on the weight of polyolefin; i.e., the unchlorinated polyolefin.

The halogenated polyolefin typically is in the form of an aqueous emulsion which can facilitate its incorporation into the aqueous adhesive composition of the present invention. A particularly suitable halogenated polyolefin is CP 310W, an aqueous emulsion of 30% solids chlorinated polypropylene emulsion, available from Eastman Chemical Company.

The adhesion promoting agent, and particularly a halogenated polyolefin which is different from the polychloroprene (a), can be present in the aqueous adhesive composition of the present invention in an amount of about 0.5 to about 25 percent by weight, more preferably in an amount of about 2 to about 25 percent by weight, and most preferably in an amount of about 5 to about 15 percent by weight. The amount of adhesion promoting agent (b) present in the aqueous adhesive composition of the present invention can range between any combination of these values, inclusive of the recited values.

In addition to the polychloroprene ingredient (a) and adhesion promoting agent (b), the aqueous adhesive composition of the present invention further includes a high heat resistance polyurethane polymer dispersion, preferably one with a crossover temperature of at least 65° C., more preferably with a crossover temperature of at least 115° C., and most preferably with a crossover temperature of at least 140° C. The polyurethane polymer typically is dispersed in water prior to incorporation into the aqueous adhesive composition. The ionic salt groups present in the polyurethane polymer can facilitate dispersion of the polyurethane polymer into the aqueous medium. The polyurethane polymer can include either cationic or anionic salt groups, but typically the polyurethane polymer (c) comprises anionic salt groups. The polyurethane resin (c) can be prepared by methods well known in the art, for example, by reaction of a polyisocyanate with a polyfunctional hydroxy compound (i.e., a polyol).

The polyisocyanates for preparing the polyurethane resin of the present invention can be aliphatic or aromatic isocyanates. Representative examples are the aliphatic isocyanates such as trimethylene, tetramethylene, pentamethylene, hexamethylene, 1,2-propylene, 1,2-butylene, 2,3-butylene, and 1,3-butylene diisocyanates; the cycloalkylene compounds such as 1,3-cyclopentane, 1,4-cyclohexane, 1,2-cyclohexane diisocyanates and isophorone diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toluene, or mixtures thereof, 4,4'-toluidine, and 1,4-xylylene diisocyanates; the nuclear-substituted aromatic compounds such as dianisidine diisocyanate, 4,4'-diphenylether diisocyanate and chlorodiphenylene diisocyanate; the triisocyanates such as triphenyl methane4,4',4"-triisocyanate, 1,3,5-triisocyanate benzene and 2,4,6-triisocyanate toluene; and the tetraisocyanates such as 4,4'-dimethyldiphenyl methane-2,2',5,5'-tetraisocyanate; the polymerized polyisocyanates such as toluene diisocyanate dimers and trimers, and the like.

The polyol useful in preparing a polyurethane resin for the present composition is typically a hydroxyl terminated polyether or polyester which a hydroxyl functionality of 2 to 6, preferably 2 to 4. The polyether polyols which may be used include products obtained by the polymerization of a cyclic oxide, for example ethylene oxide, propylene oxide or tetrahydrofuranare, or by the addition of one or more such oxides to polyfunctional initiators, for example water, ethylene glycol, propylene glycol, diethylene glycol, glycerol, trimethylol propane, pentaerythritol, or Bisphenol A. Especially useful polyethers include polyoxyethylene diols, polyoxypropelene diols and triols, poly(oxyethylene-oxypropylene) diols and triols obtained by the simultaneous or sequential addition of ethylene and propylene oxides to appropriate initiators and polytetramethylene ether glycols obtained by the polymerization of tetrahydrofuran. Suitable polyesters are typically prepared from the reaction of a carboxylic acid and a polyol, for example, reaction between adipic acid or phthalic acid and ethylene glycol, propylene glycol, 1,3-butane diol, 1,4-butane diol, diethylene glycol and 1,6-hexanediol.

The polyurethane prepared by reacting a polyisocyanate with a polyfunctional hydroxy compound also contains ionic groups to make the polyurethane water dispersible. In the case of an anionic resin, the ionic groups can be acid salt groups which can be selected from the class consisting of —$OSO_3^-$, —$OPO_3^=$, $COO^-$, $SO_2O^-$, $POO^-$ and $PO_3^=$. The polyurethane can be prepared with reactants containing the acid salt group, or, as is more normally the case, can be prepared with free acid groups which can be subsequently neutralized. Typically, the polyurethane is prepared having isocyanate groups for reaction with materials which contain at least one active hydrogen atom reactive with isocyanate groups or at least one isocyanate group, and at least one group capable of salt formation. Most often, the acid group is in the active hydrogen material because isocyanates containing acid groups typically are not stable. It is also possible to stabilize the polyurethane dispersion by the use of internal surfactants, for example methoxylated polyethylene glycol.

Specific examples of compounds which contain active hydrogens and acid groups capable of salt formation are hydroxy and mercapto carboxylic acid. Examples include dimethylol propionic acid, glycollic acid, thioglycollic oxalauric acid, lactic acid, malic acid, dihydroxy malic acid, tartaric acid, dihydroxy tartaric acid, and 2,6-dihydroxybenzoic acid. Other examples of compounds which contain active hydrogens and acid groups are aminocarboxylic acids, aminohydroxy carboxylic acids, sulfonic acids, hydroxy sulfonic acids and aminosulfonic acids. Examples include acid, anilido acetic acid, glycine, alpha-alanine, 6-amino caproic acid, reaction product of ethanolamine and acrylic acid, hydroxy ethyl propionic acid, 2-hydroxyethane sulfonic acid and sulphanilic acid. As mentioned above, amino acids must be used in the presence of a base such as potassium hydroxide (KOH) or a tertiary amine. Other examples include bis-hydroxymethylphosphinic acid, trimethylol propane monophosphate and monosulfate, N-hydroxyethyl-aminoethylphosphonic acid. Suitable salt forming agents for acid group-containing compounds include inorganic and organic bases such as sodium hydroxide, potassium hydroxide, ammonia and tertiary amines.

Suitable anionic salt group-containing polyurethane polymers are described in U.S. Pat. No. 5,430,094.

By "high temperature resistance" it is meant that the high temperature cross-over, obtained by rheological analysis on a strain rate controlled instrument (temperature sweep at 10 rad/sec on 8 mm parallel plates from 140° C. to −40° C.) is at least 65° C., more preferably at least 115° C., and most preferably at least 140° C.

A particularly suitable anionic salt group-containing polyurethane polymer is Aquagrip AQ8409, which is a 36 percent by weight polyurethane dispersion available from Bostik, Inc. Other particularly preferred polyurethane polymer dispersions are Aquagrip AQ8122 and AQ8187 (respectively 38% solids and 31% solids), which are polyurethane dispersions available from Bostik, Inc.

Besides acid salt groups which are anionic and are preferred, the polyurethane alternatively can comprise cationic salt groups such as those which can be selected from quaternary ammonium groups, phosphonium groups, sulfonium groups, and mixed groups thereof. The polyurethane can be prepared with reactants containing the cationic salt groups, or as is more normally the case, polyurethanes containing suitable precursors can be converted to the cationic salt by adding an acid to the prepolymer. Suitable materials for introducing cationic groups into the polyurethane are materials which contain at least one active hydrogen atom reacted with isocyanate groups, or at least one isocyanate group and at least one group capable of cationic salt formation.

Other suitable cationic salt group-containing polyurethane polymers include those polyurethane polymers prepared by chain extending an isoycanate functional urethane prepolymer with polyamine and ketimine. Such polyurethane polymers are described in detail in U.S. Pat. No. 5,652,299, column 3, line 1 to column 5, line 29, incorporated herein by reference.

The polyurethane polymer dispersion (c), can be present in the aqueous adhesive composition of the present invention in an amount of about 0.5 to about 40 percent by weight, more preferably in an amount of about 5 to about 40 percent by weight, and most preferably in an amount of about 5 to about 30 percent by weight. The amount of polyurethane polymer (c) present in the aqueous adhesive composition of the present invention can range between any combination of these values, inclusive of the recited values.

In addition to polychloroprene, the adhesion promoting agent and the polyurethane polymer dispersion, the aqueous adhesive composition of the present invention also includes an aqueous tackifying resin dispersion (d).

The tackifying resins which are used in the water based adhesives of the present invention are preferably polar tackifying resins and are those which extend adhesive properties and improve specific adhesion. As used herein, the term "polar tackifying resin" include:

(a) natural and modified rosin such as, for example, gum rosin, wood rosin, tall-oil rosin, distilled rosin, hydrogenated rosin, dimerized rosin and polymerized rosin;

(b) glycerol and pentaerythritol esters of natural and modified rosin, such as, for example, the glycerol ester of pale wood rosin, the glycerol ester of hydrogenated rosin, the glycerol ester of polymerized rosin, the pentaerythritol ester of pale wood rosin, the pentaerythritol ester of hydrogenated rosin, the pentaerythritol ester of tall-oil rosin, and the phenolic modified pentaerythritol ester of rosin;

(c) phenolic-modified terpene resins such as, for example, the resin product resulting from the condensation in an acidic medium of a terpene and a phenol;

Mixtures of two or more of the above described tackifying resins may be used for some formulations.

The tackifying resin dispersion (d) can be present in the aqueous adhesive composition of the present invention in an amount of about 0.5 to about 40 percent by weight, more preferably in an amount of from about 5 to about 40 percent by weight, and most preferably from about 10 to about 30 percent by weight. The amount of tackifying resin dispersion (d) present in the aqueous adhesive composition of the present invention can range between any combination of these values, inclusive of the recited values. Examples of suitable tackifying resins include Super Ester E-730-55 which is a 55% solids rosin ester emulsion available from Arakawa Chemicals; Tacolyn 3280 which is a 55% solids hydrogenated rosin ester emulsion available from Eastman Chemicals.

The aqueous adhesive composition of the present invention also includes a rubber latex dispersion (e). The rubber latex may be natural rubber latex, a non-halogenated synthetic rubber latex, styrene-butadiene-rubber (SBR), and mixtures thereof.

An example of a suitable natural rubber latex is Natural Latex High Ammonia which is a 60.5% solids emulsion available from Centrotrade Rubber USA, Inc.

An example of a suitable non-halogenated synthetic rubber latex is Hycar 1552 which is a 53% solids emulsion of nitrile rubber available from Noveon, Inc.

An example of a suitable SBR is Butofan NS 299 which is a 54% solids SBR emulsion available from BASF.

The rubber latex dispersion can be present in the aqueous adhesive composition of the present invention in an amount of about 5 to about 98.5 percent by weight, more preferably from about 10 to about 80 percent by weight, and most preferably from about 30 to about 50 percent by weight. The amount of rubber latex dispersion (e) present in the aqueous adhesive composition of the present invention can range between any combination of these values, inclusive of the recited values.

Any of the afore-described aqueous adhesive compositions of the present invention optionally also can include other additives as are well known in the adhesives art, for example, stabilizers, colorants, surfactants, defoamers, rheology modifiers, plasticizers such as a butyl benzene sulfonamide, diluents such as propylene glycol and EPI-REZ 3510-W-60 which is a 61% solids glycidyl epoxide emulsion available from Resolution Performance Products. Such compounds and other similar compounds are useful, for example, as wetting agents and flow modifiers. Other additives can include, if desired, such materials as polyvinylidene chloride, polyvinyl acetate, polyvinyl chloride, acrylic polymer dispersions, copolymers thereof, and mixtures thereof.

As discussed above, the present composition is an aqueous adhesive composition. The composition can include water in an amount ranging from 25 to 75 weight percent, often from 40 to 60 weight percent, typically from 45 to 53 weight percent based on total weight of the aqueous adhesive composition.

It should be understood that the aforementioned adhesive compositions are storage stable and suitable for use as a single-component or "one pack" composition, that is, a composition in which all the ingredients are combined substantially prior to application without the occurrence of gelation and without an unacceptable increase in viscosity over time upon storage at a given temperature. For example, an unacceptable increase in viscosity is one which requires the addition of an amount of organic solvent and/or water sufficient to decrease the composition to spray viscosity, which causes an unacceptable drop in composition solids.

The aqueous composition of the present invention is formulated to have an initial viscosity of about 1400 to 2400 centipoise (CPS) as measured using a Brookfield viscometer with a number 3 spindle at 20 rpm and ambient temperature. The aqueous compositions of the present invention can have a less than 100 percent gain in viscosity, usually less than a 75 percent gain in viscosity, and typically less than a 50 percent gain in viscosity after 30 days storage at ambient temperature (viscosity being measured as described above). Ambient temperature is considered to be less than 28° C. and more typically at about 25° C. It should be noted that stability of the present composition is determined at ambient temperatures and that, at accelerated times and temperatures, such viscosity characteristics may differ.

In one embodiment, the present invention is directed to a multi-layer composite comprising (1) a thermoplastic substrate, typically a rigid, polyolefin substrate; (2) an adhesive layer over at least a portion of the substrate; and (3) a thermoplastic cover layer over at least a portion of the adhesive layer. The adhesive layer can be formed from any of the previously discussed aqueous adhesive compositions, but typically is formed from the previously described aqueous adhesive composition comprising (a) a polychloroprene; (b) an adhesion promoting agent which is preferably a halogenated polyolefin different from (a); (c) a polyurethane polymer comprising a high heat resistance polyurethane as described in detail above, (d) an aqueous tackifying resin dispersion, and (e) a rubber latex dispersion. The polyurethane polymer (c) is present in the aqueous adhesive composition in an amount sufficient to provide adhesion of the cover layer (3) to the substrate (1) such that the multi-layer composite passes adhesion testing as determined in accordance with Chrysler Method MS-CB132, and preferably also Toyota Creep Test Specification F7754G.

The MS-CB132 method can be described as follows. First, an initial peel strength evaluation is conducted using a 1-inch strip of the multilayer composite to ascertain the initial bond strength of the adhesive. The method consists of three separate tests: (1) a heat test: wherein a multilayer composite specimen is placed into a 175° F. oven for 250 hours; (2) a humidity test wherein multilayer composite specimen is placed into a condensing humidity cabinet and is held at 100° F. and 100 percent relative humidity for a period of 250 hours; and (3) an environmental cycle test wherein a multilayer composite specimen is placed into a 175° F. oven for 24 hours, then transferred to a condensing humidity cabinet as described above in (2) for 24 hours, followed by freezing at a temperature of −29° C. for a period of 24 hours. The environmental cycle test is repeated for two additional cycles. After each of the tests described above, bond strength of the multilayer composite is evaluated using a peel test of a 1-inch strip of the multilayer composite. An analogous peel test of the multilayer composite control which had been held at ambient conditions is also conducted 24 hours after the multilayer composite has been formed. Peel test values typically are reported in pounds of force required to remove the thermoplastic cover material from the plastic substrate to which it is bonded. For purposes of the MS-CB 132 test, peel test values must be at least 8.5 pounds or foam tear must be observed after each of the above-described tests to obtain a "pass" rating.

The Toyota Creep Test Specification F7754G can be described as follows. A 100 g weight is attached to the free extremity of a one inch wide strip sample of the multilayer composite in a 90 degree geometry, at 80 degree Celsius for 24 hours. The construction passes the test if the strip creeps less or equal to 10 mm.

As previously discussed, the substrate can be any thermoplastic substrate known in the art including, but not limited to, flexible film substrates such as those used in the production of laminates. Such flexible film substrates include thermoplastic films comprising polyolefins, polyesters and polyamides.

In a particular embodiment of the present invention, the substrate is a rigid substrate typically a polyolefin rigid substrate. Nonlimiting examples of suitable rigid substrates include those formed from polyethylene, polypropylene, thermoplastic polyolefin ("TPO"), reaction injected molded polyurethane ("RIM") and thermoplastic polyurethane ("TPU"), or combinations of the foregoing materials. In one embodiment of the present invention, the substrate comprises a rigid polypropylene substrate.

The substrate can be untreated or treated, for example by corona or plasma treatment techniques. In an embodiment of the present invention, the substrate is untreated.

Additionally, in a further embodiment of the present invention, the substrate can be formed from a material having a low surface energy, for example, a surface energy of less than or equal to 40 dynes per centimeter as measured by contact angle using the Owens-Wendt method in conjunction with a Rame-Hart Contact Angle Goniometer, the use of which will be familiar to those skilled in the art.

The thermoplastic cover layer can be any such material known to those skilled in the art. Such materials can include, without limitation, polyurethane, polyolefin, polyvinyl, and polyvinyl chloride materials, and combinations thereof.

In one embodiment, the present invention is directed to a method for adhering a thermoplastic material to a rigid substrate, typically a polyolefin substrate such as those described above. The method comprises the steps of (1) applying an aqueous composition to at least a portion of the substrate, the composition, as described above, comprising (a) a polychloroprene; (b) an adhesion promoting agent which is preferably a halogenated polyolefin different from (a); (c) a high heat resistance polyurethane polymer as described herein; (d) an aqueous tackifying resin dispersion, and (e) a rubber latex dispersion; (2) drying the composition to form a dried adhesive layer on the substrate; (3) heating the thermoplastic material separate from the substrate; (4) contacting the thermoplastic material to the dried adhesive layer; and (5) applying a vacuum to the substrate of step (4) for a time and at a temperature sufficient to adhere said thermoplastic material to said substrate.

Alternatively, the present invention provides a method for adhering a thermoplastic material to a rigid polyolefin substrate, such as those described above, comprising the steps of (1) providing a thermoplastic material (such as any of the thermoplastic cover materials described above) having a top surface and a bottom surface; (2) applying the previously described aqueous composition to the bottom surface of the thermoplastic material; (3) drying the composition to form an adhesive layer on the bottom surface of the thermoplastic material; (4) heating the thermoplastic material of step (3) separate from the substrate; (5) contacting the adhesive layer on the bottom surface of the thermoplastic material to the rigid polyolefin substrate; and (6) applying a vacuum to the substrate of step (5) for a time and at a temperature sufficient to adhere the thermoplastic material to the substrate.

The aforementioned methods of the present invention include applying the aqueous adhesive composition to the substrate, or alternatively, to the undersurface of the thermoplastic cover material. Application can be achieved in any manner known to those skilled in the art, and includes, for example, spraying or roll coating the adhesive onto the substrate, or alternatively, spraying or roll coating the adhesive composition onto the bottom surface of the thermoplastic cover material. The adhesive typically is applied at film thicknesses ranging from 1 to 15 mils (25 to 375 micrometers), and more typically from 5 to 10 mils (125 to 250 micrometers).

The adhesive composition then typically is dried on the substrate or, alternatively, on the bottom surface of the thermoplastic cover material. Drying can be achieved by allowing the coated substrate or thermoplastic material to air dry at room temperature or by actively drying the composition with elevated temperatures. Depending on the temperature, humidity, and film thickness, drying of the composition on the substrate can take from several minutes to one hour or more. For example, a film at a thickness of about 5 mils (125 micrometers) can be dried in a 70° C. oven in about 3 to 5 minutes.

After drying the composition or during the drying of the composition, the thermoplastic cover material is heated separate from the substrate to soften the material. Typically, the thermoplastic material is heated to a temperature ranging from 110° C. to 180° C. The heated material is then contacted to the dried adhesive composition on the surface of the substrate; or, alternatively, the dried adhesive composition on the bottom surface of the thermoplastic cover material is contacted to the surface of the substrate. Most typically, the material is contacted by draping the heated flexible cover material onto the substrate.

A vacuum is then applied to the flexible cover material over the substrate to draw the material into all recessed areas of the substrate thereby forming a conformal thermoplastic cover layer over at least a portion of the substrate. Typically, the vacuum is drawn for at least 10 seconds, but the time can vary dependent on the substrate size and shape. In the case of substrates which are not porous, holes can be made in the substrate so that a vacuum can pull the flexible material onto the substrate. In the case of porous materials, a vacuum can be achieved directly through the substrate without placing holes in the substrate.

Subsequent to application of a vacuum, the aqueous adhesive composition will cure at room temperature in about 8 to 16 hours. Cure can be accelerated by heating the laminated substrate. As used herein, the term "cure" (or "curing") is intended to include both crosslinking of the adhesive composition components and adhesive film formation as a result of evaporation of water and, if present, other diluents along with the development of physical and chemical properties in the resultant film such as bond strength.

As mentioned above, the aqueous adhesive composition can vary and be modified to meet less stringent or more stringent adhesive requirements, depending upon the end use application. For example, for non-automotive applications or applications where the Chrysler MS-CB132 and/or Toyota Specification F7754G peel strength test is not applicable, alternative embodiments of the adhesive compositions may meet the designated requirements. For example, in applications that do not require high heat resistance properties, a polyurethane polymer with a crossover temperature between 65° C. and 140° C. can be used.

Illustrating the invention are the following examples that are not to be considered as limiting the invention to their details. All parts and percentages in the examples, as well as throughout the specification, are by weight unless otherwise indicated.

EXAMPLES

Illustrating the invention are the following examples that are not to be considered as limiting the invention to their details. All parts and percentages in the examples, as well as throughout the specification, are by weight unless otherwise indicated.

Tests and Materials

Adhesives were spray coated with a HVLP (high volume low pressure) spray gun at 40 grams per square meter (gsm) dry onto a standard untreated polypropylene plaque manufactured by Exxon and dried in a convection oven for 7 to 10 minutes at 70° C. After cooling to room temperature for 20 minutes, a foam-backed thermoplastic cover material comprising a polyolefin cover layer backed with a polypropylene foam (POF backed TPO available from Haartz, Inc.) was put in contact with the adhesive film formed on the polypropylene substrate. The composite was placed in a hot Carver press and pressed under 1 atmosphere to a bond line temperature of 49° C. to 60° C. (120° F. to 140° F.).

The multilayer composite test plaques thus formed were cooled down to room temperature for 10 minutes prior to initial peel strength testing.

A second peel strength was performed after conditioning the multilayer composite test plaques in a controlled atmospheric environment (20° C. and 50% relative humidity) for approximately 12 hours to ensure reproducibility and accuracy of the data.

Peel strength was tested in a 180 degree geometry, by hand, in a controlled atmospheric environment (20° C. and 50% relative humidity). The test was done on a 25 mm wide sample at a hand pull speed of about 20 cm/min. The test result was considered "pass" if the peel resulted in foam tear, and "fail" if the foam delaminated from the adhesive film and/or if the adhesive film delaminated from the polypropylene plaque.

The test plaques that passed the peel test were submitted to the Toyota creep test described in the Toyota Specification F7754G (Door trim material characteristic): 25 mm wide sample, 90 deg geometry, 80° C., 100 gram load for 24 hours. To pass the test, the specimen must delaminate 10 mm or less in 24 hours.

The adhesive composition that gave the best overall results was further evaluated as follows. An automotive door panel made from 40% talc filled polypropylene (material available from RheTech, Inc.), available from LEAR, Inc. was spray-coated with the adhesive of Example 4. The adhesive film thus applied was dried in a convection oven at 70° C. for 10 minutes. The part was then allowed to cool down to room temperature for 20 minutes. At this point, a foam-backed thermoplastic cover material comprising a polyvinyl chloride cover layer backed with a polypropylene foam (POF backed PVC available from SanduskyAthol, Inc) was heated to a temperature of 137° C. to 149° C. (280° F. to 300° F.) and vacuum formed onto the adhesive-coated door panel under 26 inches of Hg for a period of 40 seconds. The resulting multilayer composite was allowed to cool down to room temperature for about 10 minutes at which time a peel test was performed as described above. Subsequent peel tests were performed after 24 hours at room temperature, after 1 week at 90° C. (194° F.) and after an additional 60 hours at 120° C. (248° F.).

Following the process described earlier, a multilayer composite comprising a standard untreated PP plaque (manufactured by Exxon), the adhesive from Example 4, and the cover material comprising the polyvinyl chloride cover layer backed with a polypropylene foam (available from SanduskyAthol, Inc) were pressed together in a Carver press. The test plaque was submitted to the Toyota creep test described in the Toyota Specification F7754G (Door trim material characteristic): 25 mm wide sample, 90 deg geometry, 80° C., 100 g load for 24 hours, 10 mm or less creep to pass.

The invention is further illustrated by way of the examples that are set forth below.

Example One

Water based adhesive compositions in Table 1 were prepared as follows. A total of 100 grams each was made and the mixing was carried out in a laboratory type mixer consisting of an agitator powered by a motor and a 200 ml vessel. The appropriate amounts of each component, calculated according to the ratios shown in the table, were added sequentially to the container under mild agitation. Hand peel tests were conducted as described earlier. Results are listed in Table 1.

TABLE ONE

| Ingredients | 1 | 2 | 3 | 4 | 5 | 12 | 13 |
|---|---|---|---|---|---|---|---|
| Butofan NS299 | | 43.5 | 36 | 31.5 | 43.5 | 38 | 38 |
| Natural latex | 45 | | | | | 19 | 19 |
| Hycar 1552 | | | | | | | |
| AQR0033 | 10 | 10 | | | 15 | | |
| L750 | | | 18 | 24.5 | | | |
| AQ8409 | 20 | 15 | 9.5 | 20 | 25 | 19 | 19 |
| AQ8122 | | | | 4 | | | |
| AQ8187 | | | | | | | |
| CP310W | 10 | 10 | 8.5 | 9.5 | 10 | 9 | |
| Auroren S-6035 | | | | | | | 9 |
| AQJB755 | | 6.5 | | | | | |
| E-730-55 | 15 | 15 | 12 | 14.5 | 5 | 15 | 15 |
| Tacolyn 3280 | | | 12 | | | | |
| EPI-REZ 3510-W-60 | | | | | 1.5 | | |
| Initial peel test | PASS | PASS | PASS | PASS | PASS | PASS | PASS |
| 24 hr peel test | PASS | PASS | PASS | PASS | PASS | PASS | PASS |

Butofan NS 299 is a 54% solids SBR emulsion available from BASF.

Natural latex High Ammonia is 60.5% in solids, available from Centrotrade Rubber USA, Inc.

Hycar 1552 is a 53% solids nitrile latex available from Noveon, Inc.

Neoprene AQR0033 and Neoprene L750 (respectively 46% solids and 50% solids) are chloroprene emulsions available from Dupont.

Aquagrip AQ8409, AQ8122 and AQ8187 (respectively 36% solids, 38% solids and 31% solids) are polyurethane dispersions available from Bostik, Inc.

CP310W is a 30% solids chlorinated polypropylene emulsion available from Eastman Chemicals.

Aquagrip JB755 is a 55% solids pressure sensitive acrylic emulsion available from Bostik, Inc.

Super Ester E-730-55 is a 55% solids rosin ester emulsion available from Arakawa Chemicals.

Tacolyn 3280 is a 55% solids hydrogenated rosin ester emulsion available from Eastman Chemicals.

EPI-REZ 3510-W-60 is a 61% solids glycidyl epoxide emulsion available from Resolution Performance Products.

Auroren S-6035 is a 30% solids maleic anhydride and acrylic modified polyolefin emulsion available from Nippon Paper Chemicals co., LTD.

Example Two

Water based adhesive compositions in Table 2 were prepared as described earlier. Peel tests and creep tests were conducted as described earlier. Results are listed in Table Two.

TABLE TWO

| Ingredients | 1 | 6 | 7 | 8 | 9 |
|---|---|---|---|---|---|
| Butofan NS299 | | 38 | | | |
| Natural latex | 45 | | 38 | | 19 |
| Hycar 1552 | | | | 38 | 19 |
| AQR0033 | 10 | | | | |
| L750 | | 19 | 19 | 19 | 19 |
| AQ8409 | 20 | 19 | 19 | 19 | 19 |
| AQ8122 | | | | | |
| AQ8187 | | | | | |
| CP310W | 10 | 9 | 9 | 9 | 9 |
| AQJB755 | | | | | |
| E-730-55 | 15 | 15 | 15 | 15 | 15 |
| Initial peel test | PASS | PASS | PASS | PASS | PASS |
| 24 hr peel test | PASS | PASS | PASS | PASS | PASS |
| Creep test Toyota | <10 mm | <10 mm | <10 mm | <10 mm | <10 mm |
| Specification F7754G | PASS | PASS | PASS | PASS | PASS |

Example Three

Water based adhesive compositions in Table 3 were prepared as described earlier. The high temperature cross-over of the polyurethane dispersions was determined, on the corresponding dried urethane films of roughly 1 mm in thickness, by dynamic mechanical analysis on an ARES rheometer, at 10 radians per second using 8 mm parallel plates.

The use of polyurethane dispersions with a high temperature crossover higher than 140° C. resulted in improved high temperature creep resistance. Results are listed in Table 3.

TABLE THREE

| Ingredients | 2 | 10 | 11 |
|---|---|---|---|
| Butofan NS299 | 43.5 | 43.5 | 43.5 |
| Natural latex | | | |
| Hycar 1552 | | | |
| AQR0033 | 10 | 10 | 10 |
| L750 | | | |
| AQ8409 | 15 | | |
| AQ8122 | | 15 | |
| AQ8187 | | | 15 |
| CP310W | 10 | 10 | 10 |
| AQJB755 | 6.5 | 6.5 | 6.5 |
| E-730-55 | 15 | 15 | 15 |
| PUD high temperature G'/G" crossover (° C.) | X > 140 | 115 | 65 |
| Initial peel test | PASS | PASS | PASS |
| 24 hr peel test | PASS | PASS | PASS |
| Creep test | <10 mm | >10 mm | >10 mm |
| Toyota Specification F7754G | PASS | FAIL | FAIL |

Example Four

Water based adhesive composition 6 was further tested in example 4 for high temperature resistance on an 40% talc filled industrial door panel obtained from LEAR as described earlier. The general appearance of the assembled part after aging was observed. Any delamination or bridging was recorded as "fail". No defect was recorded as "pass". Results are listed in Table 4.

| Composition 6 | Test Result |
|---|---|
| Initial peel test | PASS |
| Creep test | <10 mm |
| Toyota Specification F7754G POF backed TPO | PASS |
| Creep test | <10 mm |
| Toyota Specification F7754G POF backed PVC | PASS |
| Part appearance after 1 week at 90° C. | PASS |
| Peel test after 1 week at 90° C. | PASS |
| Part appearance after 60 hrs at 120° C. | PASS |
| Peel test after 60 hrs at 120° C. | PASS |

Without deviating from the spirit and scope of the present invention, many embodiments and variations can be made by using the components disclosed herein above.

We claim:

1. An aqueous adhesive composition comprising a blend of the following ingredients:
   (a) 0 to 25 percent by weight of a polychloroprene emulsion;
   (b) 0.5 to 25 percent by weight of an adhesion promoting agent that promotes adhesion to polyolefin substrates;
   (c) 0.5 to 40 percent by weight of a polyurethane polymer dispersion;
   (d) 0.5 to 40 percent by weight of an aqueous polar tackifying resin dispersion; and
   (e) 5 to 98.5 percent by weight of a rubber latex dispersion selected from the group consisting of a natural rubber latex, a non-halogenated synthetic rubber latex, styrene-butadiene-rubber (SBR) and mixtures thereof,
wherein the ingredients total 100% by weight of the composition.

2. The adhesive composition of claim 1 wherein the adhesion promoting agent is selected from the group consisting of a halogenated polyolefin other than polycholoroprene, an acrylic modified polyolefin, a hydroxylated polybutadiene, and mixtures thereof.

3. The adhesive composition of claim 2, wherein the halogenated polyolefin comprises a material selected from the group consisting of chlorinated polypropylene, chlorinated polyethylene, chlorinated ethylene-vinyl acetate copolymer, mixtures thereof, and copolymers thereof.

4. The adhesive composition of claim 1, wherein the polyurethane polymer has a crossover temperature of at least 140° C.

5. The adhesive composition of claim 1 wherein the polyurethane polymer has a crossover temperature of at least 65° C.

6. The adhesive composition of claim 1 wherein the tackifying resin is selected from the group consisting of water dispersions of rosin based tackifiers, hydrocarbon based tackifiers, phenolic modified terpene resins and cumarone-indene tackifiers.

7. The multi-layer composite comprising a blend of at least the following ingredients:
   (1) a rigid, polyolefin substrate;
   (2) an adhesive layer over at least a portion of the substrate; and
   (3) a thermoplastic cover layer over at least a portion of the adhesive layer, wherein the adhesive layer is formed from an aqueous adhesive composition comprising a blend of at least the following ingredients:
(a) 0 to 25 percent by weight of a polychloroprene emulsion;
(b) 0.5 to 25 percent by weight of an adhesion promoting agent that promotes adhesion to polyolefin substrates;
(c) 0.5 to 40 percent by weight of a polyurethane polymer dispersion;
(d) 0.5 to 40 percent by weight of an aqueous tackifying resin dispersion; and
(e) 5 to 98.5 percent by weight of a rubber latex dispersion selected from the group consisting of a natural rubber latex, a non-halogenated synthetic rubber latex, styrene-butadiene-rubber (SBR) and mixtures thereof;
wherein the ingredients total 100% by weight of the composition, and the polyurethane polymer (c) is present in an amount sufficient to provide adhesion of the cover layer to the substrate such that the multi-layer composite passes adhesion testing as determined in accordance with Toyota Creep Test Specification F7754G.

8. The multi-layer composite of claim 7, wherein the substrate is an untreated substrate.

9. The multi-layer composite of claim 7, wherein the substrate comprises polypropylene.

10. The multi-layer composite of claim 7, wherein the substrate has a surface energy of less than or equal to 40 dynes per centimeter.

11. The multi-layer composite of claim 7, wherein the cover layer comprises a material selected from polyurethane, polyolefin, polyvinyl, and mixtures thereof.

12. The multi-layer composite of claim 7, wherein the polyurethane polymer has a crossover temperature of at least 140° C.

13. The multi-layer composite of claim 7, wherein the polyurethane polymer has a crossover temperature of at least 65° C.

14. The multi-layer composite of claim 7, wherein the adhesion promoting agent is selected from the group consisting of a halogenated polyolefin other than polycholoroprene, an acrylic modified polyolefin, a hydroxylated polybutadiene, and mixtures thereof.

15. The multi-layer composite of claim 7 wherein the halogenated polyolefin comprises a material selected from the group consisting of chlorinated polypropylene, chlorinated polyethylene, chlorosulfonated polyethylene, chlorinated ethylene-vinyl acetate copolymer, mixtures thereof, and copolymers thereof.

16. The multi-layer composite of claim 7 wherein the tackifying resin is selected from the group consisting of water dispersions of rosin based tackifiers, hydrocarbon based tackifiers, phenolic modified terpene resins and cumarone-indene tackifiers.

17. A method for adhering a thermoplastic material to a rigid polyolefin substrate comprising:
(1) applying an aqueous adhesive composition to at least a portion of the substrate, the composition comprising a blend of at least the following ingredients:
(a) 0 to 25 percent by weight of a polychloroprene emulsion;
(b) 0.5 to 25 percent by weight of an adhesion promoting agent that promotes adhesion to polyolefin substrates;
(c) 0.5 to 40 percent by weight of a polyurethane polymer dispersion;
(d) 0.5 to 40 percent by weight of an aqueous tackifying resin dispersion; and
(e) 5 to 98.5 percent by weight of a rubber latex dispersion selected from the group consisting of a natural rubber latex, a non-halogenated synthetic rubber latex, styrene-butadiene-rubber (SBR) and mixtures thereof, wherein the ingredients total 100% by weight of the composition.
(2) drying said composition to form a dried adhesive layer on the substrate;
(3) heating said thermoplastic material separate from the substrate;
(4) contacting said thermoplastic material to said dried adhesive layer; and
(5) applying a vacuum to the substrate of step (4) for time and at a temperature sufficient to adhere said thermoplastic material to said substrate.

18. The method of claim 17, wherein the substrate comprises polypropylene.

19. The method of claim 17, wherein the thermoplastic material is heated to a temperature ranging from 110° C. to 180° C.

20. The method of claim 17, wherein the thermoplastic material comprises a material selected from polyurethane, polyolefin, polyvinyl, and mixtures thereof.

21. The method of claim 17, wherein the polyurethane polymer has a crossover temperature of at least 140° C.

22. The method of claim 17, wherein the polyurethane polymer has a crossover temperature of at least 65° C.

23. The method of claim 17, wherein the adhesion promoting agent is selected from the group consisting of a halogenated polyolefin other than polycholoroprene, an acrylic modified polyolefin, a hydroxylated polybutadiene, and mixtures thereof.

24. The method of claim 17, wherein the halogenated polyolefin comprises a material selected from the group consisting of chlorinated polypropylene, chlorinated polyethylene, chlorosulfonated polyethylene, chlorinated ethylene-vinyl acetate copolymer, mixtures thereof, and copolymers thereof.

25. The method of claim 17 wherein the tackifying resin is selected from the group consisting of water dispersions of rosin based tackifiers, hydrocarbon based tackifiers, phenolic modified terpene resins and cumarone-indene tackifiers.

26. A method for adhering a thermoplastic material to a rigid polyolefin substrate comprising:
(1) providing a thermoplastic material having a top surface and a bottom surface;
(2) applying an aqueous adhesive composition to the bottom surface of the thermoplastic material, the composition comprising a blend of at least the following ingredients:
(a) 0 to 25 percent by weight of a polychloroprene emulsion;
(b) 0.5 to 25 percent by weight of an adhesive promoting agent that promote adhesion to polyolefin substrates;
(c) 0.5 to 40 percent by weight of a polyurethane polymer dispersion;
(d) 0.5 to 40 percent by weight of an aqueous tackifying resin dispersion; and
(e) 5 to 98.5 percent by weight of a rubber latex dispersion selected from the group consisting of a natural rubber latex, a non-halogenated synthetic rubber latex, styrene-butadiene-rubber (SBR) and mixtures thereof, wherein the ingredients total 100% by weight of the composition;
(3) drying said composition to form an adhesive layer on the bottom surface of said thermoplastic material;
(4) heating said thermoplastic material of step (3) separate from the substrate;

(5) contacting said adhesive layer on the bottom surface of the thermoplastic material to the rigid polyolefin substrate; and (6) applying a vacuum to the substrate of step (4) for a time and at a temperature sufficient to adhere said thermoplastic material to said substrate.

27. The method of claim 26, wherein the substrate comprises polypropylene.

28. The method of claim 26, wherein the thermoplastic material is heated to a temperature ranging from 110° C. to 180° C.

29. The method of claim 26, wherein the thermoplastic material comprises a material selected from polyurethane, polyolefin, polyvinyl, and mixtures thereof.

30. The method of claim 26, wherein the polyurethane polymer has a crossover temperature of at least 140° C.

31. The method of claim 26, wherein the polyurethane polymer has a crossover temperature of at least 65° C.

32. The method of claim 26, wherein the adhesion promoting agent is selected from the group consisting of a halogenated polyolefin other than polycholoroprene, an acrylic modified polyolefin, a hydroxylated polybutadiene, and mixtures thereof.

33. The method of claim 26, wherein the halogenated polyolefin comprises a material selected from the group consisting of chlorinated polypropylene, chlorinated polyethylene, chlorosulfonated polyethylene, chlorinated ethylene-vinyl acetate copolymer, mixtures thereof, and copolymers thereof.

34. The method of claim 26 wherein the tackifying resin is selected from the group consisting of water dispersions of rosin based tackifiers, hydrocarbon based tackifiers, phenolic modified terpene resins and cumarone-indene tackifiers.

* * * * *